United States Patent
Houston et al.

(10) Patent No.: US 6,778,541 B2
(45) Date of Patent: Aug. 17, 2004

(54) DYNAMIC DATA TUNNELLING

(75) Inventors: Allen Houston, Ballyclare (GB); Paul Fee, Belfast (GB); Christopher Murton, Chelmsford (GB); Ewart Tempest, Ottawa (CA); Philip Christian, Bishop's Stortford (GB)

(73) Assignee: Nortel Networks Limited, St. Laurent (CA)

( * ) Notice: Subject to any disclaimer, the term of this patent is extended or adjusted under 35 U.S.C. 154(b) by 785 days.

(21) Appl. No.: 09/727,644

(22) Filed: Dec. 1, 2000

(65) Prior Publication Data

US 2002/0067731 A1 Jun. 6, 2002

(51) Int. Cl.[7] .............................................. H04L 12/56
(52) U.S. Cl. ...................................... 370/401; 370/466
(58) Field of Search ................................. 370/400, 401, 370/466, 389, 392, 467

(56) References Cited

U.S. PATENT DOCUMENTS

| | | | | |
|---|---|---|---|---|
| 5,430,727 A | * | 7/1995 | Callon | 370/401 |
| 5,623,605 A | * | 4/1997 | Keshav et al. | 709/236 |
| 5,684,796 A | * | 11/1997 | Abidi et al. | 370/389 |
| 5,796,736 A | * | 8/1998 | Suzuki | 370/254 |
| 6,597,704 B1 | * | 7/2003 | Wong | 370/466 |

* cited by examiner

Primary Examiner—Chau Nguyen
Assistant Examiner—Christine Ng
(74) Attorney, Agent, or Firm—Barnes & Thornburg (57) ABSTRACT

The present invention relates to data tunnelling and in one embodiment to the tunnelling of IP (Internet Protocol) data across an OSI (Open Systems Interconnect) network. In the preferred embodiment, network elements include both an OSI stack and an IP stack, and a respective directory of OSI addresses and corresponding IP subnets. Each network element generates a routing data packet, conveniently a Link State Packet (LSP), which includes the OSI address and IP subnet(s) associated with that network element. The LSPs are distributed across the network in normal manner. Upon receipt of an LSP from another network element, each network element updates its respective directory in respect of said other network element. Thus, each directory is automatically updated to reflect changes in the network, particularly in respect of IP subnets. This arrangement significantly reduces the need for manual tunnel configuration in the network. In an alternative embodiment, the invention provides dynamic data tunnelling of OSI data over an IP network.

51 Claims, 9 Drawing Sheets

DYNAMIC DATA TUNNELLING

FIELD OF THE INVENTION

The present invention relates to the field of data tunnelling. Particularly, but not exclusively, the invention relates to the tunnelling of Internet Protocol (IP) data across an Open Systems Interconnection (OSI) based network.

BACKGROUND TO THE INVENTION

Many conventional Data Communication Networks (DCNs), such as a Synchronous Digital Hierarchy (SDH) network or Synchronous Optical Network (SONET), are based on the open systems interconnection (OSI) reference model. The network elements (NEs) operate, and communicate with one another, using OSI protocols.

In an Internet protocol (IP) network, such as the Internet or an Intranet, the network devices, such as personal computers (PCs), communicate with one another using an alternative set of protocols, such as Transmission Control Protocol/Internet Protocol (TCP/IP) or User Datagram Protocol/Internet Protocol (UDP/IP).

With the increasing popularity of IP devices and IP communication, and given the relatively large infrastructure of existing data networks which are OSI based, it is desirable to enable IP devices to communicate across an OSI network and vice versa.

There is a fundamental problem, however, in that OSI and IP protocols do not interoperate. IP data cannot therefore be sent directly over an OSI network and vice versa.

It is known to address this problem using a technology known as data tunnelling. Data tunnelling is the encapsulation of a first protocol within a second protocol. For example, in IP over OSI data tunnelling, IP data is encapsulated within OSI packets that are suitable for transmission across an OSI network. To implement data tunnelling, each network element (NE) in the OSI network includes a look-up table that correlates OSI addresses and IP addresses (or IP sub-nets). When an NE is to send IP data to an IP device across the OSI network, the NE determines an IP address, or IP subnet, associated with the recipient IP device and refers to the look-up table to determine a corresponding OSI address. The NE then encapsulates the IP data into OSI data packets, incorporating the determined OSI address.

The OSI network element also includes a database, commonly known as a Routing Information Base (RIB), which includes information describing the topography of the network to which the NE is connected, namely, identification of each of the other NEs connected to the network and an indication of their relative positions in the network.

Once the IP data is encapsulated, the NE refers to the RIB to determine how the encapsulated IP data packet should be routed in order to reach said determined OSI address and sends the encapsulated data across the OSI network accordingly.

A problem with this arrangement is that conventional lookup tables are static and need to be manually updated if there are any changes in the OSI network. In general, as long as there is an OSI route between the start point and end point of a data tunnel, then normal OSI routing protocol (ISIS) causes the tunnel to re-route, or reconfigure, to accommodate changes in the OSI network. However, should the start or end points of a tunnel change, then there is a requirement to reconfigure the tunnel manually. For example, if a further NE is added to the network, or one of the existing NEs is removed, then the look-up table of each NE in the network must be updated manually. Conventionally, therefore, the data tunnels created by encapsulation are static and require manual configuration to accommodate certain changes in the network. This is undesirable since manual tunnel configuration is labour intensive and time consuming. Further, any undue delays in reconfiguring the data tunnels to reflect changes in the network can result in loss of data.

SUMMARY OF THE INVENTION

Accordingly, a first aspect of the invention provides a network element associated with a first identifier,
complying with a set of one or more first protocols, and with one or more second identifiers, complying with a set of one or more second protocols, the network element being arranged for operation in a network that includes one or more other like network elements,
the network element including a directory of respective first identifiers and respective second identifiers for at least said other like network elements,
the network element being arranged to generate a routing data packet and to cause said routing data packet to be distributed to said other network elements,
wherein said routing data packet includes routing information identifying said first identifier and said one or more second identifiers,
and wherein the network element is arranged to, upon receipt of a routing data packet from another like network element, determine said routing information from said received routing data packet and to update said directory in respect of said other like network element.

Thus, each directory is automatically updated to reflect changes in the network. This arrangement has the effect of creating dynamic data tunnels across the network and significantly reduces the need for manual tunnel configuration in the network.

One aspect of the invention relates particularly to the tunnelling of IP data across an OSI network. An alternative aspect of the invention relates particularly to the tunnelling of OSI data across an IP network.

The invention also provides a network comprising one or more network elements according to the first aspect of the invention. In one embodiment, the network is arranged to support OSI protocols. In an alternative embodiment, the network is arranged to support IP protocols. In a further embodiment, the network comprises a plurality of network areas, at least one of said network areas being arranged to support IP protocols including Integrated IS-IS routing protocol, and at least one of said other network areas being arranged to support OSI protocols including IS-IS routing protocol.

The invention further provides a method of maintaining data tunnels in a network comprising network elements according to the first aspect of the invention.

The invention also provides a computer program and a computer program product arranged for implementing the network element, network and method of the invention in whole or in part. In particular, the invention provides a computer readable medium comprising computer program instructions for causing a network element to perform said method of maintaining data tunnels.

Other aspects of the invention will become apparent to those ordinarily skilled in the art upon review of the following description of specific embodiments of the invention and with reference to the accompanying drawings.

DETAILED DESCRIPTION OF THE DRAWINGS

Figure 1:
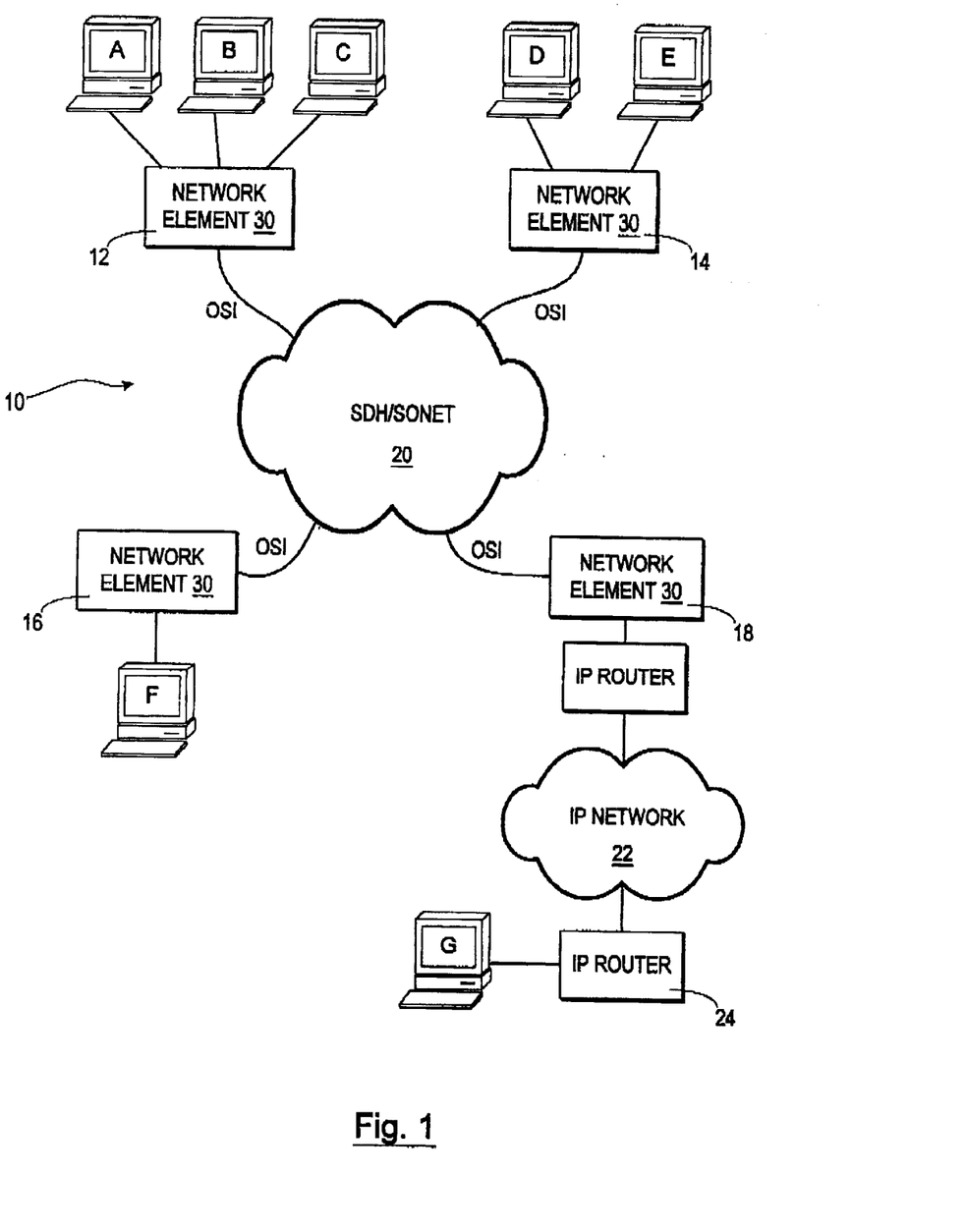
FIG. 1 is a schematic diagram of a Data Communications Network (DCN) including network elements (NEs) embodying aspects of the present invention.

With reference to FIG. 1 of the drawings there is shown, generally indicated at 10, a data communications network (DCN), also known as a telecommunications network or packet switched data network. A synchronous Digital Hierarchy (SDH) network or a Synchronous Optical Network (SONET) are exemplary of the network 10. The network 10 includes a plurality of network nodes or network elements (NEs) 12, 14, 16, 18 that are arranged to route data packets (not shown) across the network infrastructure 20. In FIG. 1, four network elements are shown but in practice, there may be any number of network elements.

Communication between network elements is performed in accordance with a first protocol, or set of first protocols, in particular the Open Systems Interconnect (OSI) protocols as used in SDH and SONET networks. In an OSI network, the network elements 12, 14, 16, 18 therefore include software (not shown in FIG. 1) for supporting the OSI protocol. The NEs 12, 14, 16, 18 are commonly referred to as Intermediate Systems (IS) and may take the form of, for example, a multiplexer or other routing device. It will be noted that a protocol set may comprise one or more protocols and is sometimes referred to as a protocol stack.

Each network element 12, 14, 16, 18 may be in communication with one or more non-routing hosts or nodes, commonly known as End Systems (ES). In FIG. 1, the End Systems are shown as computers A-F. Conventionally, to be compatible with the network 10, an ES must also support the OSI protocol. For example, assuming that computer A and computer E are OSI devices (i.e. they support OSI protocols) then computers A and E may communicate with one another via NE 12, NE 14 and the network infrastructure 20. Data is transmitted between computers A and B in OSI data packets. The methods of communication between ES and IS (known as the ES-IS protocol and described in ISO 9543) and between IS and IS (known as the IS-IS protocol and described in ISO 10589) are included in the OSI protocols and are well known. ISO 9543, ISO 10589 (and other OSI protocols) are available from the International Organization for Standardization (ISO) currently at www.iso.ch, the contents of which are hereby incorporated by reference.

Internet Protocol (IP) devices support a set of one or more second protocols namely, the TCP/IP or other IP protocols, and communicate with one another using IP data packets. Since the OSI protocols and IP protocols are incompatible, IP data packets cannot be sent directly across an OSI network. For example, assuming in FIG. 1 that computers B, C, D and F are IP devices, they cannot communicate with one another across the network 10 using only IP protocols since network 10 is an OSI network.

With the increasing popularity of IP devices it is desirable, particularly to organizations that operate OSI networks, to enable OSI networks to carry IP data and hence to allow communication between IP devices across an OSI network. For example, in FIG. 1, computer G is a management entity, or data manager, such as a management information base (MIB) browser. Computer G is an IP device connected to an IP network 22 via an IP router 24 and is external to the network 10. If computer G is to perform management functions in respect of computers B, C, D and F, it needs to be able to communicate with those computers, or at last with an IP stack (not shown in FIG. 1) associated with the respective computers B, C, D, F.

It is known to transmit data packets of one protocol within data packets of another protocol and this technology is commonly referred to as data tunnelling or encapsulation. Tunnelling between OSI and IP protocols can be achieved by a number of conventional means including Generic Router Encapsulation (GRE) protocol (detailed in RFC 1701 and 1702) and Experimental OSI network (EON) protocol (detailed in RFC 1070). For the purpose of the present invention, GRE is preferred and the contents of RFC 1701 and 1702 are hereby incorporated herein by reference.

Using GRE, IP data packets may be encapsulated within OSI data packets suitable for transporting across the network 10. In order that encapsulated data packets may be transmitted across the network 10, the NEs 12, 14, 16, 18 must also have access to information correlating the OSI address of each NE 12, 14, 16, 18 with a respective IP address, or IP subnet, associated with the, or each, IP device available via the respective NE. As is well known, an IP subnet may include one or more IP addresses and the term IP subset, as used hereinafter, is intended to embrace the term IP address.

Conventionally, each NE 12, 14, 16, 18 is provided with a static look-up table (not shown), or directory, that associates IP subnets with a corresponding OSI address (also known as an NSAP address). Thus, when an NE 12, 14, 16, 18 receives an encapsulated IP data packet destined for a particular IP subnet the NE refers to the look-up table and determines a corresponding OSI address to which to send the encapsulated IP data packet. For example, if NE 16 receives an encapsulated IP data packet from computer F destined for computer D, NE 16 extracts from the encapsulated IP data packet an destination IP subnet (which will be that of computer D) and determines from the look-up table a corresponding OSI address which, in the present example, will be that of NE 14. NE 16 then causes the encapsulated IP data packet to be routed to NE 14.

A problem with this conventional arrangement is that each IP over OSI tunnel must be configured manually i.e. the look-up table for each NE must be constructed and provided to each network element manually. Further, the static nature of the look-up tables does not accommodate changes in the network 10 resulting from, for example, the addition, or removal, of a NE or IP device to or from the network 10. In the event of any such changes, the look-up table for each NE on the network 10 must be updated manually i.e. more manual tunnel configuration is required. Manual tunnel configuration is undesirable as it is time consuming and can be inconvenient.

OSI protocol ISO 10589 includes a routing protocol (hereinafter referred to as the IS-IS (Intermediate System-to-Intermediate System) routing protocol) that determines how OSI-based IS network elements route OSI data packets across an OSI network. Part of the IS-IS routing protocol requires that each IS NE identifies each of its neighbouring IS NEs (also known as 'adjacencies') and determines the state of the connection or link between it and its neighbours. This information is used to create routing data packets, known as Link State PDUs (LSPs), which are transmitted across the network to each IS NE. PDU stands for Protocol Data Unit, which is the OSI term for packet. LSPs may therefore also be referred to as Link State Packets. In this way, each IS NE is able to build up a map of the network to which it is connected. Each IS NE uses the information provided in received LSPs to create and update an OSI routing database, commonly known as a routing information base (RIB). The topography of the network can be determined from the RIB and so each IS NE is able to determine how to route an OSI data packet to a given OSI address. LSPs are typically transmitted periodically by each IS NE and also whenever an IS NE determines that there has been a change in a link between itself and a neighbouring IS NE—for example, when a link has failed or when a new neighbouring IS NE is detected. Thus, the RIBs are updated to reflect any changes in the network. The structure and content of LSPs are well known and defined in ISO 10589.

In accordance with the present invention, it is proposed to modify the routing protocol used by NEs and the LSPs generated by NEs to allow dynamic IP over OSI data tunnels to be created.

Figure 2A:
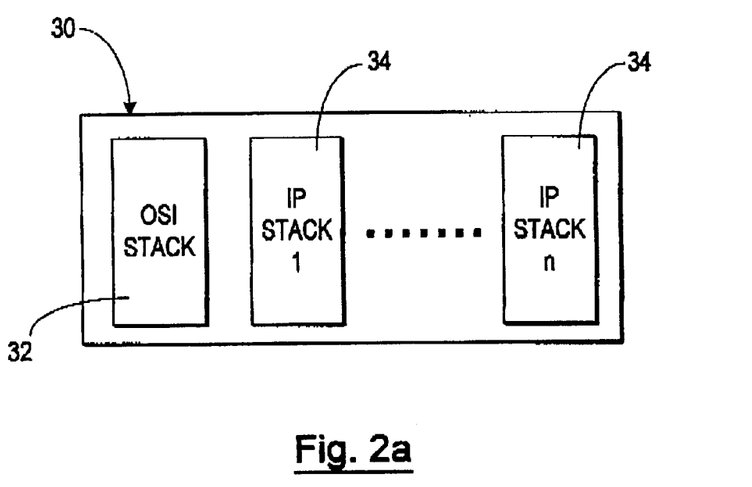
FIG. 2a is a first schematic diagram of a network element (NE) of FIG. 1.

Referring now to FIG. 2, there is shown a schematic view of an NE 30 arranged in accordance with the present invention. In order to co-operate with the OSI network 10, the NE 30 includes a first protocol stack in the form of an OSI stack 32, the OSI stack 32 comprising conventional software modules (not shown in FIG. 2) for supporting the OSI protocols. In order to communicate with one or more IP devices, the NE 30 includes, or is associated with, at least one second protocol stack in the form of an IP stack 34, the IP stack 34 comprising conventional software for supporting IP protocols such as TCP/IP and/or UDP/IP. The OSI stack 32 is associated with a first identifier in the form of an OSI address (or NSAP) while the, or each, IP stack is associated with a second identifier in the form of a respective IP subnet. An IP stack may be associated with, or belong to, more than one IP subnets (an IP stack can have one or more interfaces (e.g. Ethernet, ISDN) and each interface can have zero or more IP addresses. Hence, the IP stack may be a member of zero or more IP subnets).

The OSI address may be used to identify the NE 30 on the OSI network 10. The, or each, IP subnet may to used to identify one or more IP devices that are associated with, i.e. reachable from, the NE 30. Where there are external entities or IP devices (e.g. computer G in FIG. 1) that do not form part of the network 10, an IP subnet associated with the IP stack 34 may refer to an external IP subnet associated with the external IP device so that IP data may be transmitted to the external IP device (across the IP network 22 in the example of FIG. 1). The NE 30 is suitable for use as the NEs 12, 14, 16, 18, all of which are associated with one or more respective IP devices (computers B and C; computer D; computer F; and computer G respectively).

Figure 3:
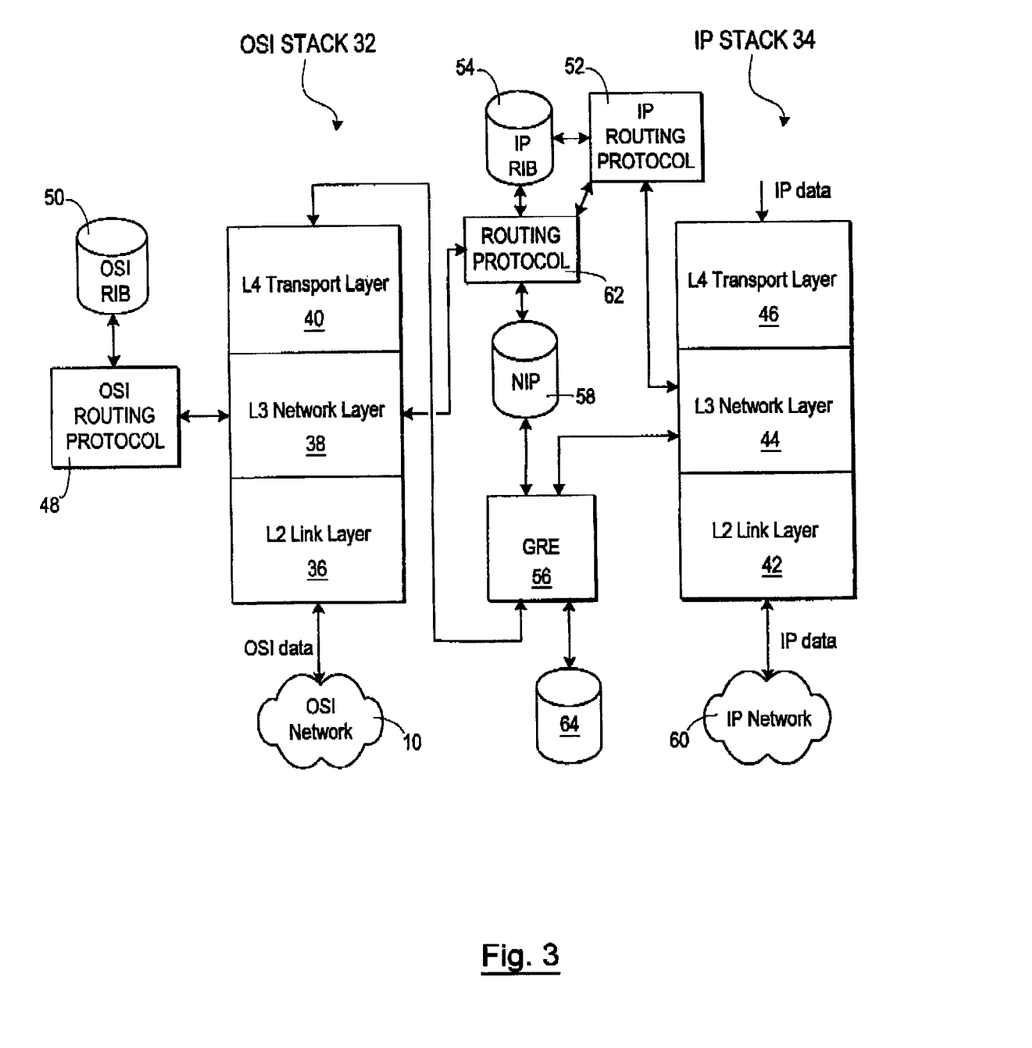
FIG. 3 is a second, and more detailed, schematic diagram of said network element (NE)

Referring now to FIG. 3, there is shown a more detailed schematic view of the NE 30. In FIG. 3, only one IP stack 34 is shown. The OSI stack 32 includes conventional software for implementing the Data Link Layer (L2) 36, the Network Layer (L3) 38 and the Transport Layer (L4) 40 of the OSI reference model. The remaining layers of the OSI reference model are not shown for reasons of clarity. The OSI Network Layer 38 may conveniently implement the CLNS (ConnectionLess-mode Network Service) protocol as defined in ISO 8473-1, or other suitable conventional protocol. The OSI Transport Layer 40 may conveniently implement the CLTP (ConnectionLess-mode Transport Service) protocol as defined in ISO 8602, or other suitable conventional protocol. The OSI Data Link Layer 36 may for example implement the ITU-T Q.921 ISDN User-Network Interface Data Link Layer specification, specifying the Link Access Procedures on the D-channel (LAPD). This data link layer protocol is normally used on the Embedded Communications Channel, provided as part of the SDH/SONET frame. The LAPD protocol does not support the transport of the IP network layer (L3) i.e. the LAPD data link layer cannot carry IP data and hence the need for data tunnelling.

Similarly, the IP stack 34 includes conventional software for implementing the IP Data Link Layer (L2) 42, the IP Network Layer (L3) 44 and the IP Transport Layer (L4) 46. The IP Network Layer 44 may conveniently implement the IP described in RFC 791. The IP Transport Layer 46 may conveniently implement the TCP and/or UDP protocols as defined in RFC 761 and RFC 768 respectively. The IP Data Link Layer 42 may conveniently implement the Ethernet protocol as defined in ISO 8802-2, ISO 8802-3, or, for point-to-point communications, may implement PPP (Point-to-Point Protocol, RFC 1171, 1172).

The NE 30 also includes an OSI routing protocol module 48, also conveniently in the form of software, arranged for implementing an OSI routing protocol such as the IS-IS routing protocol. The OSI routing protocol module 48 is co-operable with an OSI routing database, or OSI RIB 50, which includes routing, circuit, adjacency and LSP information concerning the OSI network 10. In use, the OSI routing protocol module 48 co-operates with the OSI RIB 50 and the OSI Network Layer 38 to send and receive OSI data packets across the OSI network 10. The OSI routing module 48 also creates and maintains the OSI RIB 50 in conventional manner.

Associated with the IP Network Layer 44 is an IP routing protocol module 52, conveniently in the form of software, arranged for implementing an IP routing protocol such as RIP (Routing Information Protocol) as detailed in RFC 1058 (Version 1) and PFC 1723 (Version 2) and/or Open Shortest Path First (OSPF) routing protocol as detailed in RFC 2328. The IP routing protocol module 52 is co-operable with an IP routing information base, or IP RIB 54, conveniently in the form of a database, which includes conventional routing, circuit, adjacency and link state information concerning an IP network 60 to which the IP stack 34 is connected. In normal use, the IP routing protocol module 52 co-operates with the IP RIB 54 and the IP Network Layer 44 to send and receive IP data packets across the IP network 60. The IP routing module 54 also creates and maintains the IP RIB 54 in conventional manner.

The NE 30 further includes an encapsulation module 56 which may conveniently be arranged to implement the GRE protocol, or other suitable encapsulation protocol. The GRE protocol module 56 enables communication between the OSI Transport Layer 40 and the IP Network Layer 44/IP routing protocol module 52. The GRE protocol module 56 provides data link layer type services to the IP Network Layer 44/IP routing protocol module 52 using the services of the OSI stack 32 and enables IP data packets to be transmitted over the OSI network 10. The IP routing protocol module 52 must decide, for each IP data packet, whether to send the packet to the GRE protocol module 56 (i.e. to cause the packet to be sent over the OSI network 10) or to send the packet to the IP Data Link Layer 42 (i.e. to cause the packet to be sent over the IP network 60). Clearly, the decision depends on the destination IP subnet associated with the IP data packet. To this end the conventional IP routing protocol requires modification or is required to operate in association with a supplementary IP routing protocol. FIG. 3 conveniently shows a supplementary routing protocol module 62 which is arranged to supplement the operation of the IP routing protocol module 52 as required and as described in more detail below.

The GRE protocol module 56 is co-operable with a directory, or look-up table 58 (labelled NIP in FIG. 3), conveniently in the form of a database, which stores information identifying IP subnets which are available via the OSI network 10, correlated or mapped to a corresponding OSI address on the network 10. Optionally, and particularly in cases where the NE 30 includes more than one IP stack 34, the NIP 58 also includes one or more entries identifying the IP subnets that are available locally i.e. associated with its own OSI address. This allows data packets to be transmitted between IP stacks 34 that are included in, or associated with, the same NE 30. When the GRE protocol module 56 receives an IP data packet (not shown) from the IP Network Layer 44, it determines the destination IP subnet and refers to the NIP 58 to determine a corresponding OSI address. Upon determining the corresponding OSI address, the GRE protocol encapsulates the IP data packet in conventional manner, the encapsulated packet including the determined OSI address (as well as the destination IP subnet or IP address). The encapsulated packet is then forwarded to the OSI stack 32 for transmission across the OSI network 10.

In order to provide dynamic data tunnels between the IP devices, or IP stacks, on the network 10, it is necessary to cause the NIP database 58 to be automatically updated to reflect the state of the network 10. This is achieved by causing the LSPs generated by each NE 30 associated with one or more IP subnets to include information identifying the, or each, respective IP subnets that are available, or reachable, via the respective NE 30. The LSPs are transmitted across the network 10 in normal manner and the included IP subnet information is used to update the NIP database 58. In the present embodiment, the functions, or operations, required to implement the foregoing are conveniently included in supplementary routing protocol module 62 and are described in more detail below.

Figure 2B:
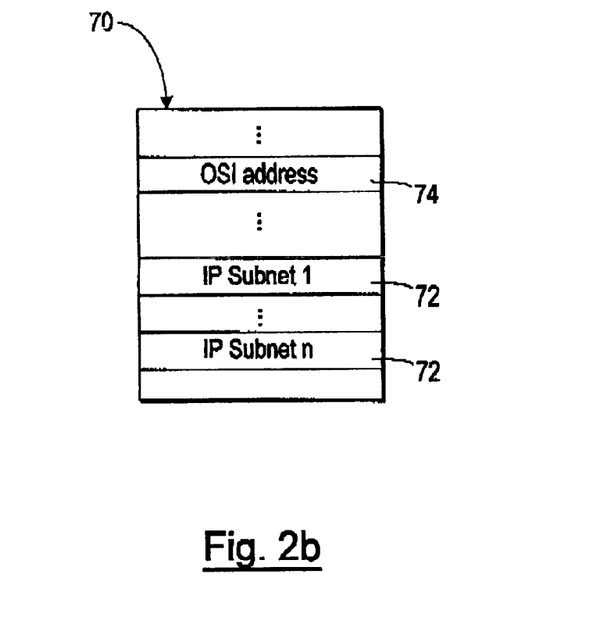
FIG. 2b is a schematic representation of a routing data packet, in particular an LSP routing data packet.

FIG. 2b is a schematic representation of a routing data packet in the form of a modified LSP 70. The LSP 70 is modified in the sense that it includes additional information over a standard IS-IS LSP. In particular, the LSP 70 includes information, or routing information, identifying the, or each, IP subnet that is reachable via the NE that generates the LSP 70. In FIG. 2b the LSP 70 includes n IP subnet identifiers in IP subnet fields 72, each IP subnet field 72 set to correspond with a respective IP stack 34 of the NE 30 shown in FIG. 2a.

For example, with reference to FIG. 1, in the case where NE 16 receives an LSP 70 from NE 12, the LSP 70 includes IP subnet information for both IP devices B and C. It should be noted that IP devices B and C may be reachable via the same IP subnet (but different IP addresses) or by different respective IP subnets. The LSP 70 also includes an OSI address identifier in an OSI address field 74, which serves as an LSP identifier in that it identifies the OSI address of the NE 30 that generated the LSP 70. The LSP 70 may include other information fields as defined by the routing protocol being implemented e.g. IS-IS, but these are not shown in FIG. 2b for reasons of clarity.

Conveniently, the LSP 70 can be generated in accordance with a protocol entitled "Use of OSI IS-IS for Routing in TCP/IP and Dual environments" (commonly known as Integrated IS-IS) which is detailed in Request for Comment (RFC) 1195 and is available from the Internet Engineering Task Force (IETF) at www.ietf.org. RFC 1195 is hereby incorporated herein by reference. RFC 1195 describes how to add IP-specific fields to IS-IS routing packets (LSPs). For example, an IP subnet identifier 72 may conveniently be added to an LSP by adding an IP address field (not shown) and an IP subnet mask (not shown). It will be noted that RFC 1195 relates to data packet routing in IP networks and dual IP/OSI environments. In accordance with RFC 1195, all data packets (IP and OSI) are forwarded "as is" i.e. RFC 1195 itself is not concerned with data tunnelling nor, conventionally, is it used in relation to data tunnelling.

The operation of the network element 30 is now described with reference to FIGS. 4 to 7. For reasons of clarity, only those operations that are relevant to the present invention are shown.

Figure 4:
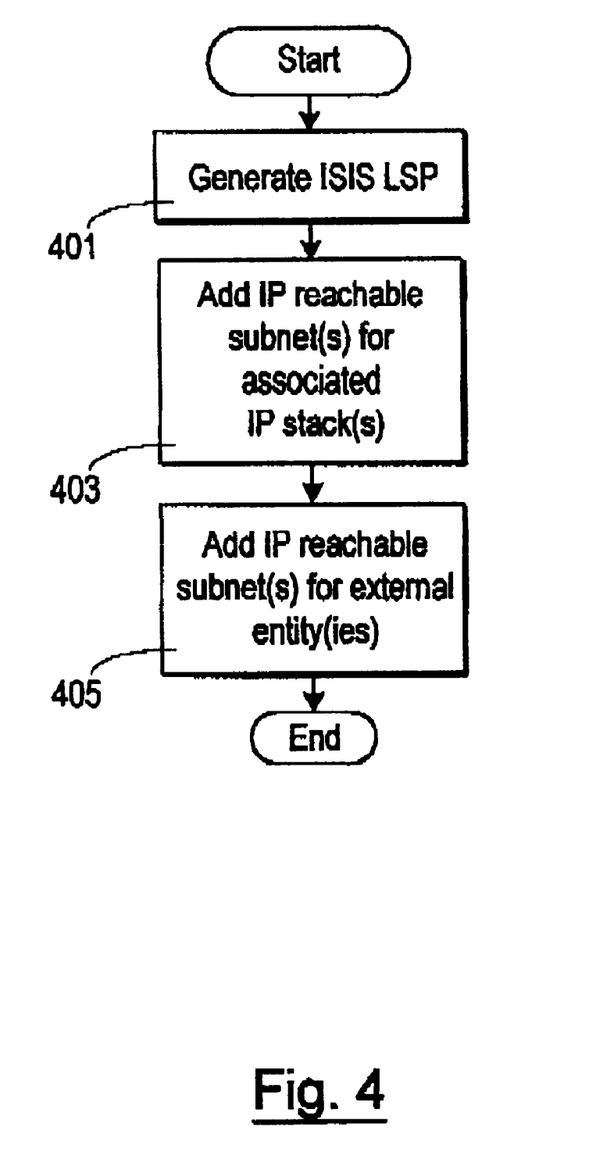
FIG. 4 is a flowchart illustrating a first set of operations performed by a network element in accordance with the present invention.

Referring now to FIG. 4, it is shown how an NE 30 generates an LSP 70 for transmitting, or flooding, across the network 10. Firstly, a conventional routing packet, for example an ISIS LSP is generated (operation 401). Then, in operation 403, the NE 30 includes into the LSP 70 information identifying the, or each, IP subnet reachable via the NE 30. In the preferred embodiment, this involves including an IP subnet field 72 in which a respective IP subnet is identified for the, or each, IP stack associated with the NE 30.

Optionally, the LSP 70 may include information concerning IP reachable subnet(s) for external entity(ies), i.e. entities which do not form part of the network 10. For example, with reference to FIG. 1, computer G does not form part of the network 10 and can therefore be considered to be an external entity. When the network element 18 generates an LSP 70, it may include not only IP subnet information relating to the, or each, IP stack 34 included in the network element 18 but also identification of the IP stack associated with computer G as an external entity. This enables IP data to be tunnelled towards computer G even though computer G does not form part of the network 10. This allows IP data to be tunnelled to the edge of the OSI network 10 for forwarding via the external IF network 22.

Figure 5:
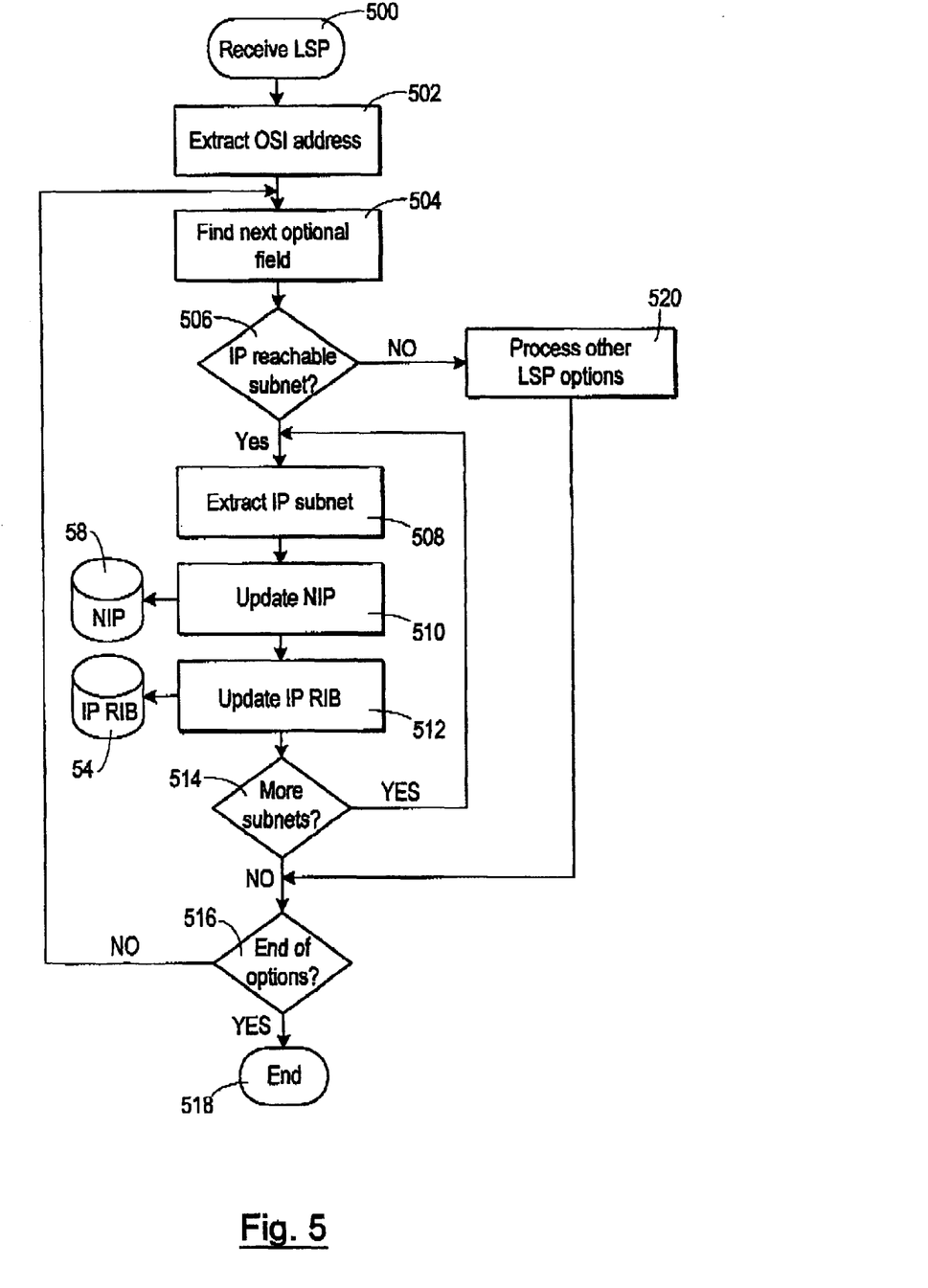
FIG. 5 is a flowchart illustrating a second set of operations performed by a network element in accordance with the present invention.

FIG. 5 illustrates how routing packets, and in particular LSPs 70, are used by the NE 30 to update the NIP database 58 and the IP RIB 54. In operation 500, the NE 30 receives an LSP 70 in conventional manner. In operation 502, the NE 30 determines, in conventional manner, from the LSP 70 the OSI address of the network element from which the LSP 70 emanated. With reference to FIG. 2b, the OSI address is available from the OSI address field 74. The extracted OSI address serves as an LSP identifier and enables the NE 30 to fit the information contained within the LSP 70 into the context of the network 10.

In operations 504 and 506, the NE 30 examines the remaining fields of the LSP 70 in search of an IP subnet field 72. When an IP subnet field 72 is found, the NE 30 extracts the IP subnet information contained therein (operation 508).

At module 510, the NE 30 updates the NIP database 58 so that the extracted IP subnet information is stored in association with the OSI address determined during operation 502. Updating the NIP database 58 in this way, ensures that data tunnels between the NE 30 and IP devices (not shown) that are reachable via another NE on the network 10 are dynamic and do not require manual re-configuration in response to changes to the network 10.

In operation 512, the NE 30 updates the IP RIB 54 so that the IP routing protocol module can determine which IP subnets are available via the GRE interface with the network layer 44 of the IP stack 34.

In operation 514, the NE 30 searches for further IP subnet information within the LSP 70. Operations 508, 510, and 512 are repeated for each IP subnet included in the LSP 70.

In operation 516, the NE 30 determines whether or not the LSP 70 contains any further information fields. If so, then the NE 30 returns to operation 514. If not, then the processing of the LSP 70 terminates.

It will be understood that the LSP 70 may contain further information in line with the routing protocol being used e.g. ISIS. The detailed processing of such additional information is not shown in FIG. 5 for reasons of clarity and is covered generally by operation 520 which is performed when, at module 506, the NE 30 determines that there is no IP subnet information to be processed.

Figure 6:
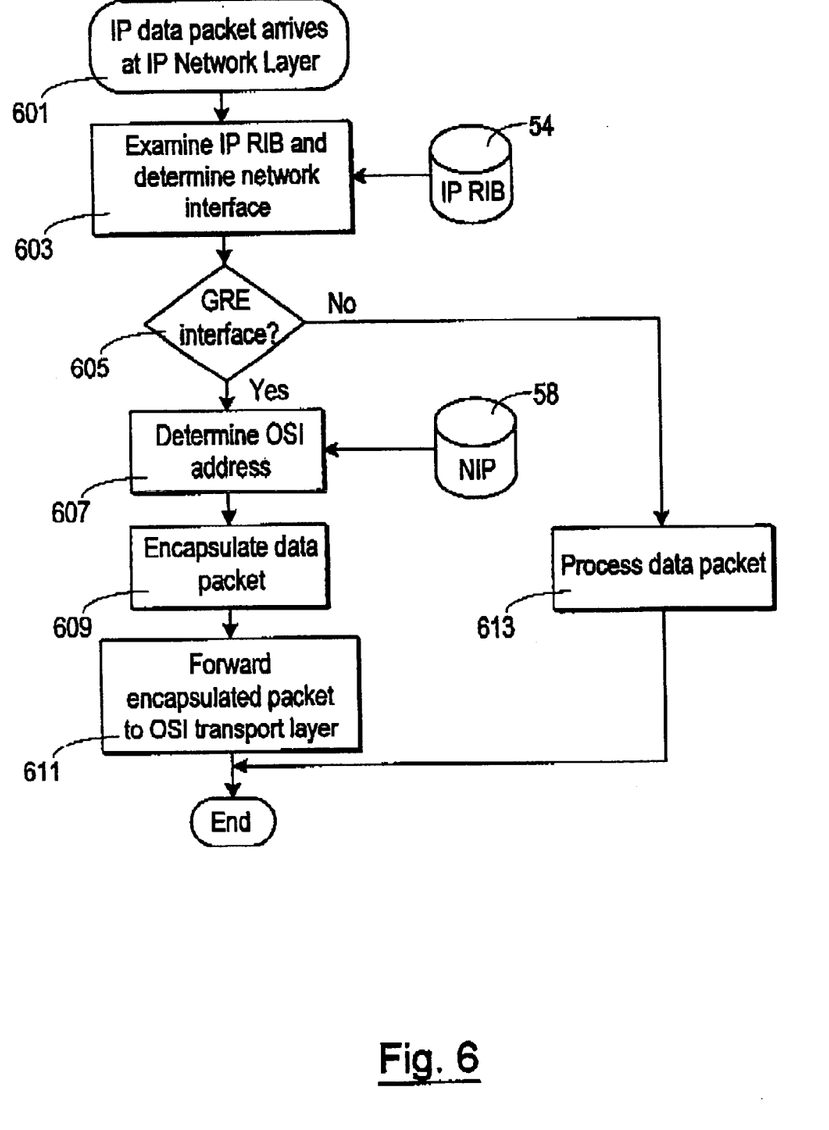
FIG. 6 is a flowchart illustrating a third set of operations performed by a network element in accordance with the present invention.

FIG. 6 illustrates how the NE 30 processes an IP data packet (not shown) received at the IP network layer 44. In operation 601, the IP data packet is received by the IP network layer 44 in conventional manner, for example via Telnet (RFC 854) which provides remote login facilities, or via SNMP (Simple Network Management Protocol (RFC 1157) which provides remote management capabilities through the manipulation of a MIB (Management Information Base).

In operation 603, the NE 30 determines whether the received IP data packet is destined for an IP address, or IP subnet, which is reachable across the OSI network 10, or whether the IP data packet is destined for an address which is reachable across the conventional IP network 60 (FIG. 3). To make this decision, the NE 30 refers to the IP RIB 54 which stores information identifying whether or not a given IP subnet is reachable across the OSI network 10 (i.e. via the interface of the GRE module 56 with the IP network layer 44) or the IP network 60. As described with reference to FIG. 5, the IP RIB 54 is updated in accordance with the information provided in the LSP 70 to reflect changes in the network 10 to ensure as far as possible that a correct decision is made during this operation.

If, in operation 605, the NE 30 determines that the IP data packet needs to be transmitted across the OSI network 10, then the IP routing protocol module 52 (in conjunction with the routing protocol module 62) causes the IP data packet to be provided to the GRE protocol module 56 for encapsulation.

Operations 607, 609 and 611 relate to the operations performed by the GRE protocol module 56. In operation 607, the GRE protocol module 56 determines the destination IP subnet (which usually is a specific IP address) from the IP data packet and refers to the NIP database 58 to determine the corresponding OSI address. As described with reference to FIG. 4 (operation 510) the NIP database 58 is, in accordance with the invention, updated to reflect changes in the network 10. This creates a dynamic tunnel between a given IP subnet and corresponding OSI address.

In operation 609, the GRE protocol module 56 encapsulates the IP data packet into an OSI data packet incorporating the retrieved OSI address (as well as the destination IP subnet or IP address).

In operation 611, the GRE protocol module 56 forwards the encapsulated IP data packet to the transport layer 40 of the OSI stack 32 in the NE 30. The OSI stack 32 then causes the encapsulated IP data packet to be sent across the OSI network 10 in conventional manner and in accordance with the routing protocol being implemented. In the present example, this is controlled by the OSI routing protocol module 48 in conjunction with the OSI RIB 50, implementing ISIS routing protocol.

If, during operation 605, the NE 30 determines that the IP data packet is destined for an IP subnet which is available across the IP network 60, then the IP data packet is provided to the data link layer 42 of the IP stack 34 for transmitting across the IP network 60 in conventional manner (generally represented as operation 613).

Figure 7:
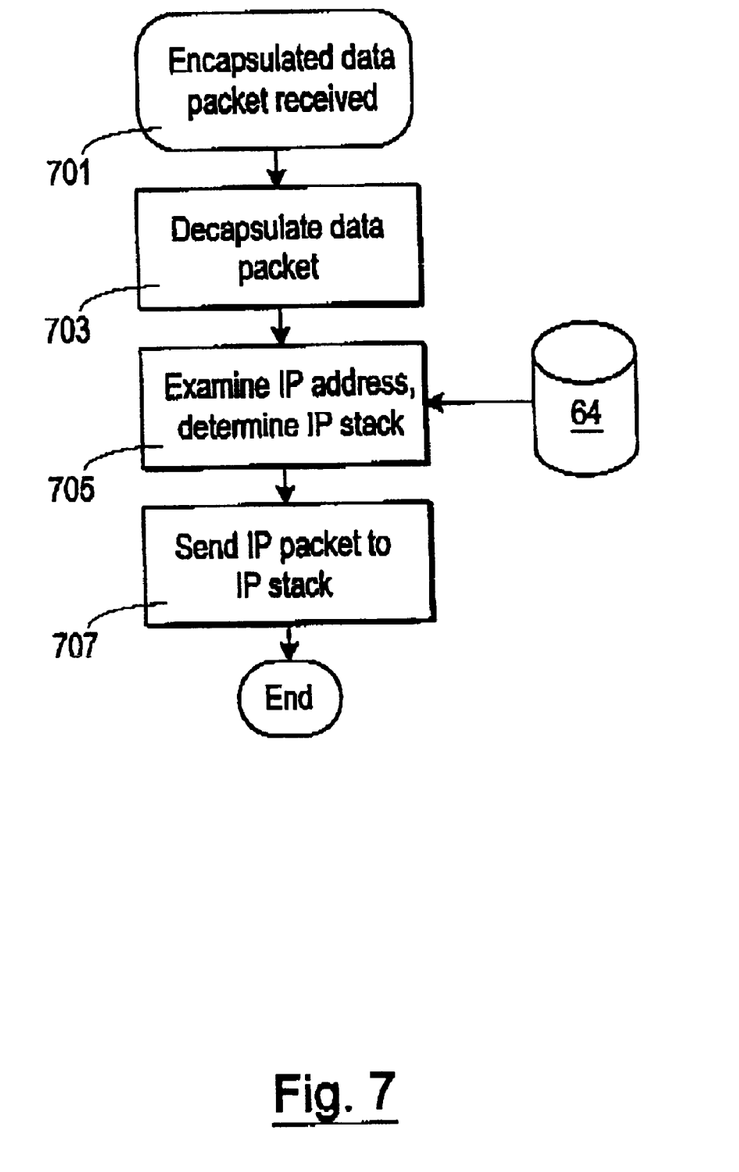
FIG. 7 is a flowchart illustrating a fourth set of operations performed by a network element in accordance with the present invention.

FIG. 7 illustrates how the NE 30 processes an encapsulated data packet that has been received across the network 10. The encapsulated IP data packet is received by the OSI stack 32 in conventional manner. The GRE protocol module 56 presents itself to the OSI stack 32 as a user of the transport layer 40—just like other applications (not shown) on the NE 30. Data packets destined for the GRE protocol module 56 are addressed to its TSAP (Transport Service Access Point). Similarly, outbound GRE encapsulated data packets are addressed to a remote NSAP (Network Service Access Point) that corresponds with the destination NE. The GRE encapsulated data packets are also addressed to the remote TSAP which, once the packet has arrived at the destination NE, causes the packet to be directed to the appropriate transport user i.e. the GRE protocol module 56 for decapsulation. For the purposes of the invention, the TSAP of the GRE protocol module 56 is arbitrary but consistent between NEs.

If it is determined that that the received data packet is an encapsulated data packet, then the data packet is forwarded to the GRE protocol module 56 for decapsulation (module 703). In the example of FIG. 3, there is only one IP stack 34 and so the decapsulated IP data packet is returned to the network layer 44 of IP stack 34. In this case, the IP address contained within the decapsulated IP data packet corresponds to the GRE interface of the network layer 44 of the IP stack 34. In alternative embodiments (not shown) however there may be more than one IP stack associated with, or included in, the NE 30 and, during operation 705, the NE 30 determines to which stack the decapsulated IP data packet is to be sent. Each IP stack has a respective interface with the GRE module 56 (referred to herein as a GRE interface), each GRE interface being associated with one or more respective IP addresses or IP subnets. The GRE module 56 is arranged to determine to which IP stack to send the decapsulated data packet by comparing the destination IP address/subnet in the data packet with the respective IP addresses/subnets associated with the respective IP stacks. To this end, the NE 30 preferably also includes a further database 64, or other storage means available to the GRE module 56, that stores information correlating reachable IP stacks with respective IP subnet/IP address information. Further, in cases where one or more of said IP stacks is associated with a reachable external IP subnet, then the database 64 also includes information identifying the, or each, external IP subnet reachable by the respective IP stack. In the case of data packets destined to external subnets, the destination IP address is a member of an external subnet reachable via one of the associated IP stacks 34. The GRE module 56 uses database 64 to determine which associated IP stack 34 should receive the data packet.

In operation 707, the decapsulated data packet is sent to the appropriate IP stack 34.

A skilled person will appreciate from the foregoing that, in accordance with the present invention, IP over OSI data tunnels are set up across the network 10 by means of the NIP database 58 and that the database 58 is updated to reflect changes in the network 10 using IP subnet or routing information contained within LSPs, or routing packets. As a result, the IP over OSI tunnels are dynamic and this greatly reduces the amount of manual configuration work that is required to create and maintain the tunnels.

The IP RIB database 54 is also updated using the IP subnet information included in the LESPs so that the IP stack 34 can correctly determine whether a given IP data packet requires to be forwarded across the OSI network 10 or an IP network 60. In some cases, an IP stack associated with a network element may not be connected to an IP network. Further, the GRE module 56 may be the only interface with the IP stack 34 i.e. the IP stack 34 is only able to forward data packets via the GRE module 56. In any event, the IP RIB 54 is updated with respect to IP subnets reachable via the GRE interface.

It will be noted that the embodiment of the invention described above is particularly suitable for use within an OSI level 1 network area.

It will be appreciated that, for illustrative purposes, the modifications made to conventional OSI and IP routing protocols are shown in FIG. 3 as being implemented in the supplementary routing module 62. It will be understood that the routing protocol modifications do not necessarily need to be implemented in a separate module as shown in FIG. 3 and may be implemented in any convenient manner. For example, the modifications could be made to the OSI routing protocol module 48 and the IP routing protocol module 52.

It will further be understood that the invention is described herein in the context of OSI and IP protocols but is not limited to use with such. The skilled person will appreciate that the invention may also be applied to other first and second routing protocols other than OSI and IP. Further, the invention may be used to tunnel OSI data packets over an IP network.

In the following description, IP devices are referred to as network elements NEs for convenience. However, the term network node may equally be used. An IP router is an example of a suitable network node.

Figure 8:
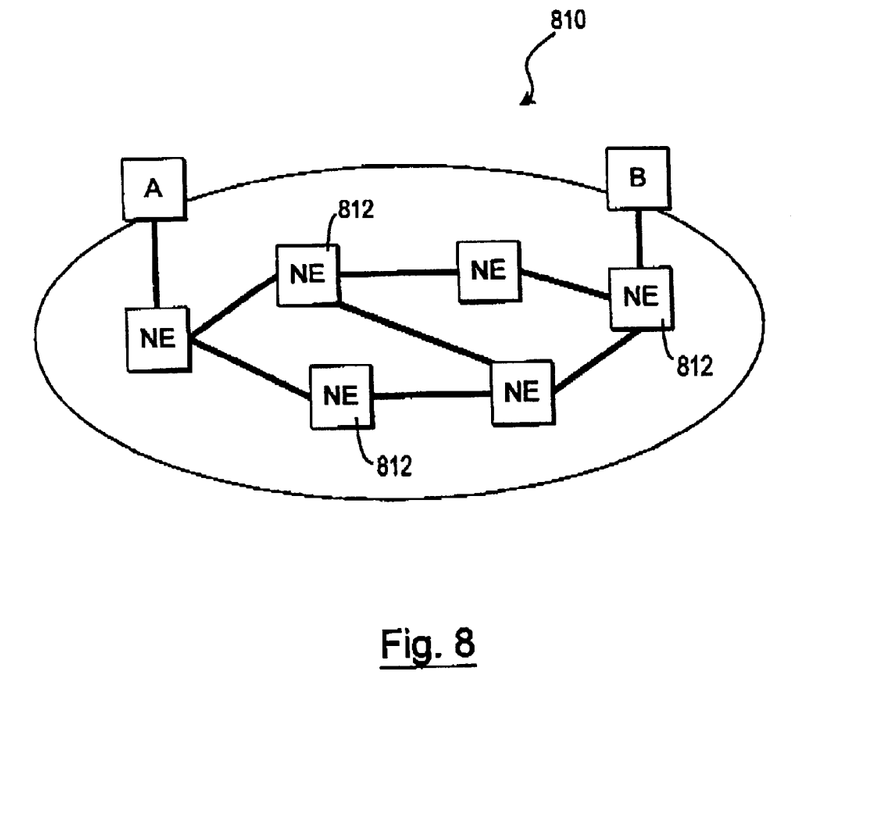
FIG. 8 is a schematic diagram of a data communications network including network elements arranged in accordance with the invention.

FIG. 8 shows a data network 810 comprising network elements (NE) 812, each arranged to support IP only. Network elements (NE) A and B support OSI and may communicate with one another across the network 810 by means of OSI over IP tunnels. To this end, NEs A and B must also support IP. Conveniently, therefore, NEs A and B comprise both an IP stack and an OSI stack (not shown).

The network 810 is arranged to support Integrated IS-IS and the IP NEs 812 distribute LSPs in the normal manner. NEs A and B are arranged to distribute LSPs that include information identifying their respective OSI address (which comprises the second identifier in this example) and respective IP interface address (which comprises the first identifier in this example). NEs A and B further include a respective directory (not shown) that associates OSI addresses with corresponding IP interface addresses. Thus, to send OSI data packets from NE A to NE B, NE A refers to said directory and determines the IP interface address of NE B. NE A then encapsulates each OSI data packet to be sent inside an IP data packet (using GRE encapsulation, for example) having said determined IP interface address as a destination IP address. The encapsulated OSI data packet is launched across the network 810 and is carried, or tunnelled, across the IP NEs 812 to NE B.

NE B is arranged to recognise whenever an incoming IP data packet encapsulates an OSI data packet and to perform decapsulation. NE B thus retrieves the OSI data for use in normal manner with conventional OSI applications.

NEs A and B are further arranged to update their respective directories with address information extracted from the other's respective LSPs received via the network 810. In this way, the data tunnel between NE A and NE B is dynamic and does not require manual configuration.

It will be appreciated that the simple network 810 shown in FIG. 8 is given by way of example only and that there may be more than two NEs that support OSI around the network.

Figure 9:
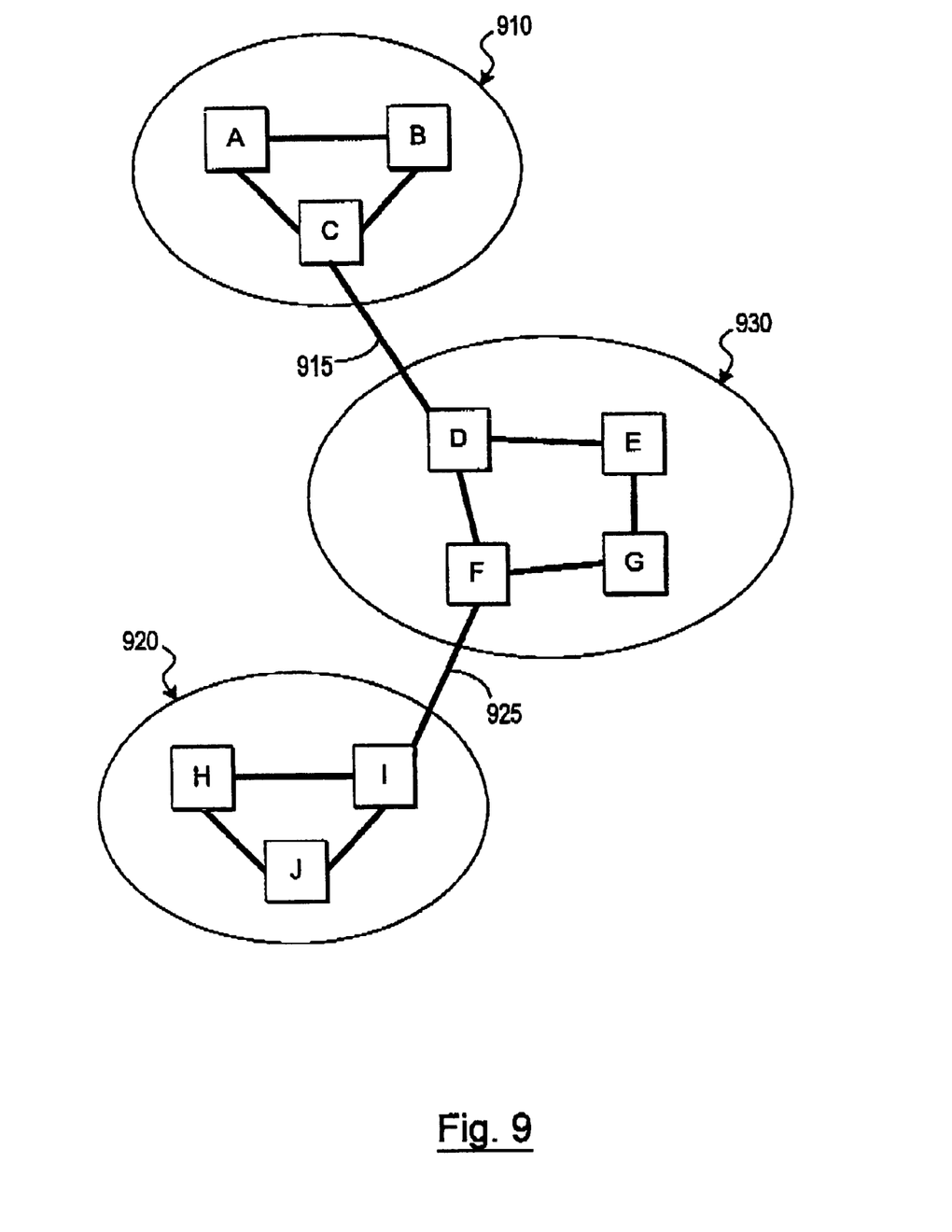
FIG. 9 is a schematic diagram of a data communications network comprising three network areas and including network elements arranged in accordance with the present invention.

By way of further example, OSI networks may be connected across an IP network that supports Integrated IS-IS. This is conveniently achieved by segregating the OSI networks from the IP network via level 2 routing. FIG. 9 illustrates an example where two OSI networks 910, 920 are separated by an IP network 930 that is arranged to support Integrated IS-IS.

In OSI network 910, NEs A and B are arranged to support OSI only while NE C is arranged to support both OSI and IP protocols. NEs A, B and C are arranged in a first IS-IS network area. NE C is arranged to act as a level 2 router for NEs A and B.

In IP network 930, NEs D, E, F and G are arranged to support IP only and are arranged in a second IS-IS network area. NEs D and F are arranged to act as level 2 routers.

NE C therefore has a level 2 only association, or link, with NE D and is arranged to communicate with NE D using IP only via IP link 915.

In OSI network 920, NEs H and J are arranged to support OSI only while NE I is arranged to support both OSI and IP protocols. NEs H, J and I are arranged in a third IS-IS network area. NE I is arranged to act as a level 2 router for NEs H and J. NE I therefore has a level 2 only association, or link, with NE F and is arranged to communicate with NE F using IP only via IP link 925. NEs C, D, F and I together form a level 2 subdomain, on which only IP runs.

The network elements that are at the edge of each OSI network and are arranged to act as level 2 routers (NE C for OSI network 910 and NE I for OSI network 920) are arranged to send and receive level 2 LSPs across the level 2 subdomain to advertise connectivity to their respective IS-IS network area and hence to their respective OSI network.

The level 2 LSPs (not shown) are conveniently conformant with RFC 1195. As such, each level 2 LSP includes an OSI address identifier, corresponding to the OSI address associated with the NE that generates the LSP; at least one IP interface address identifier corresponding to a respective IP interface address associated with the generating network element; connectivity information identifying any other level 2 routers with which the NE has an adjacency; and information identifying any network areas of which the NE is a member (this is part of ISO/IEC 10589 and is referred to by RFC 1195).

In accordance with normal IS-IS protocol, the IS-IS area to which an NE belongs is included in the OSI address of the NE (and therefore also in the OSI address identifier included in the LSPs).

Thus, the level 2 LSPs distributed by NE C are arranged to identify the OSI address of NE C (which includes identification of said first IS-IS network area i.e. network 910) and to identify the IP interface address of NE C. Similarly, the level 2 LSPs distributed by NE I are arranged to identify the OSI address of NE I (which includes identification of said first IS-IS network area i.e. network 920) and to identify the IP interface address of NE I.

NE C and NE I each include a respective directory for associating IP interface addresses with corresponding OSI addresses in respect of each NE acting as a level 2 router on the edge of an OSI network. NE C and NE I are arranged to update their respective directories using the information contained in the level 2 LSPs distributed by like level 2 routers and received across the level 2 subdomain. In the simple example illustrated in FIG. 9, the directory of NE C need only hold an entry identifying the IP interface address and OSI address of NE I, and vice versa.

As will be seen from the following example, the provision of the directory enables an NE serving as a level 2 router in an OSI network to tunnel OSI data packets to another OSI network across an IP network. By updating the directory in the manner described above, the data tunnel between the two OSI networks is dynamic and does not require manual updating.

By way of example, should it be required that NE A send an OSI packet to NE J, NE A determines, in accordance with conventional IS-IS protocol, that NE J is in a different IS-IS area and therefore forwards the OSI data packet to its level 2 router, which in FIG. 9 is NE C.

NE C determines, in accordance with conventional IS-IS protocol, that the OSI data packet is destined for a network element within said third IS-IS network area 3.

From the level 2 LSPs that NE C has received from NE I, NE C knows both the OSI address and an IP interface address for NE I. In accordance with conventional IS-IS, NE C refers to its OSI routing table (not shown) and determines that to reach IS-IS network area 3, the data packet should be forwarded towards NE I. NE C determines the OSI address of NE I from the OSI routing table. Before being sent towards the IP network 930, the OSI data packet requires to be encapsulated in an IP data packet. To this end, NE C refers to its directory to determine the IP address, or IP interface address, associated with the OSI address of NE I.

NE C encapsulates the OSI data packet into an IP packet, with the destination address on that packet set to the IP address of NE I. NE C then forwards the IP encapsulated OSI packet towards NE D which is its next hop for reaching the level 2 router for IS-IS area 3, namely NE I.

The IP encapsulated OSI packet is forwarded across the IP network 930 in conventional manner towards NE I which, in the present example, is via the NEs D and F in their capacity as level 2 routers.

NE I receives the IP encapsulated OSI packet and removes the original OSI packet which was destined for NE J. NE I then forwards the OSI packet to NE J in conventional manner.

Consideration must also be given to how an NE determines whether or not data tunnelling is required and whether or not the tunnel destination is capable of terminating the tunnel.

In the embodiment described with reference to FIGS. 1 to 7, this is straightforward. An OSI only or legacy OSI node does not use any IP related fields in an LSP or other routing data packet. This can be used as an indication that the NE only supports OSI. A bi-lingual NE, i.e. one that supports both IP and OSI, can be detected by the fact that they use IP related fields in their LSPs. Thus, in a network of the type described with reference to FIGS. 1 to 7, the NEs 30 are arranged to determine from LSPs or other routing data packets received from another NE whether said other NE supports OSI only or is bi-lingual. If, for example, the NE determines that a destination NE is bi-lingual, then it can also determine that the destination NE is capable of terminating a data tunnel.

The situation is not so straightforward when distinguishing IP only devices from bi-lingual OSI/IP devices. For each type of device, generated LSPs contain an OSI address as an OSI address is mandatory in all LSPs generated in accordance with the standards. The LSPs also contain IP fields as IP is supported by both types of device. It is necessary therefore to determine by some other means whether or not the device supports OSI. In the embodiment illustrated in FIGS. 1 to 7 this can be achieved by determining whether or not the device supports CLNP.

To this end, the bi-lingual NEs are preferably arranged to use the "Protocols Supported" field of LSPs as defined in RFC 1195. In this way, a bi-lingual NE can provide an indication of the protocols it supports and so enable other NEs to determine whether or not data tunnelling is necessary to reach that NE and whether or not that NE can terminate the data tunnel.

In FIG. 9, OSI networks 910, 920 are separated by IP network 930. The Level 2 routers NE C and NE I for the respective OSI networks 910, 920 are responsible for tunnelling the OSI data over the IP network 930.

In this network arrangement, there are two options. First, a network topology rule may be implemented whereby NE C and NE I are configured to know that their connection to the Level 2 subdomain is IP only. Hence they will know to create an OSI over IP tunnel.

The preferred option is that all bi-lingual routers (i.e. NE C and NE I) use the "Protocols Supported" field in their LSPs. The intermediate NEs (D & F) would preferably also use the protocols supported field.

Using the information on which protocols are supported, an OSI data packet will be placed in an IP tunnel if the next hop does not support native OSI on the data link layer between the two nodes (NEs).

In some cases it is possible to conclude which protocols a node (NE) supports without using the protocols supported field. For example, where IP reachability options are present in the routing data packet but no IP Interface addresses, the NE supports OSI over the data link layer, supports IP over OSI tunnels (this is the only way to get IP packets to the node (NE) as it has no IP interfaces at the normal data link layer), and has IP connections to associated IP stacks which have not implemented integrated IS-IS.

The specific network structures shown in the drawings, and in particular FIGS. 1, 8 and 9 are provided by way of example and are not limiting.

The invention is not limited to the embodiments described herein which may be modified or varied without departing from the scope of the invention.

What is claimed is:

1. A network element associated with a first identifier, complying with a set of one or more first protocols, and with one or more second identifiers, complying with a set of one or more second protocols, the network element being arranged for operation in a network that includes one or more other network elements each associated with a first identifier, complying with a set of one or more first protocols, and with one or more second identifiers, complying with a set of one or more second protocols, the network element including a directory of respective first identifiers and respective second identifiers for at least said other network elements, the network element being arranged to generate a routing data packet and to cause said routing data packet to be distributed to said other network elements, wherein said routing data packet includes information identifying said first identifier and said one or more second identifiers, and wherein the network element is arranged to, upon receipt of a routing data packet from one of said other network elements, determine said information from said received routing data packet and to update said directory in respect of said other network element.

2. A network element as claimed in claim 1, wherein the routing data packet further includes a second identifier relating to an entity supporting said set of second protocols and being external of said network.

3. A network element as claimed in claim 1, wherein the network element includes a first protocol stack for supporting said set of first protocols; and a second protocol stack for supporting said set of second protocols, said first identifier being associated with said first protocol stack and said one or more second identifiers being associated with said second protocol stack.

4. A network element as claimed in claim 3, wherein said network element includes more than one second protocol stack, each second protocol stack being associated with one or more respective second identifiers.

5. A network element as claimed in claim 3, wherein said network is arranged to support said set of first protocols, the network element further including a data encapsulation module arranged to receive, from said second protocol stack, a data packet, which complies with said set of second protocols and includes a destination second identifier; to encapsulate said data packet to comply with said first set of protocols; and to provide the encapsulated data packet to said first protocol stack for transmittal across the network, wherein said data encapsulation module is arranged to refer to said directory to determine a first identifier corresponding to said destination second identifier; and to include said determined first identifier in said encapsulated data packet.

6. A network element as claimed in claim 5, further including a routing information base that includes information identifying second identifiers associated with second protocol stacks that are available across the network, wherein the network element is arranged to, upon receipt of a routing data packet from one of said other network elements update said routing information base in respect of one of said other network elements.

7. A network element as claimed in claim 1, wherein said set of first protocols comprise Open Systems Interconnect (OSI) protocols.

8. A network element as claimed in claim 7, wherein said first identifier comprises an OSI address.

9. A network element as claimed in claim 7, arranged to support Intermediate System-to-Intermediate System (IS-IS) routing protocol.

10. A network element as claimed in claim 9, wherein said data routing packet comprises a Link State Protocol Data Unit (LSP) generated in accordance with integrated IS-IS routing protocol.

11. A network element as claimed in claim 1, wherein said set of second protocols comprise Internet Protocol (IP) protocol.

12. A network element as claimed in claim 11, wherein said second identifier comprises an IP subnet.

13. A network element as claimed in claim 1, wherein said first set of protocols comprise Internet Protocol (IP) protocol.

14. A network element as claimed in claim 13, wherein said first identifier comprises an IP interface address.

15. A network element as claimed in claim 13, arranged to support Integrated Intermediate System-to-Intermediate System (IS-IS) routing protocol.

16. A network element as claimed in claim 15, wherein said data routing packet comprises a Link State Protocol Data Unit (LSP) generated in accordance with Integrated IS-IS routing protocol.

17. A network element as claimed in claim 1, wherein said second set of protocols comprise Open Systems Interconnect (OSI) protocols.

18. A network element as claimed in claim 17, wherein said second identifier comprises an OSI address.

19. A network element as claimed in claim 1, wherein the network element is arranged to act as an OSI level 1 router.

20. A network element as claimed in claim 1, wherein the network element is arranged to act as an OSI level 2 router.

21. A network comprising a network element associated with a first identifier complying with a set of one or more first protocols and with one or more second identifiers complying with a set of one or more second protocols, the network including one or more other network elements each associated with a first identifier complying with a set of one or more first protocols and with one or more second identifiers complying with a set of one or more second protocols, the network element including a directory of respective first identifiers and respective second identifiers for at least said other network elements, the network element being arranged to generate a routing data packet and to cause said routing data packet to be distributed to said other network elements, wherein said routing data packet includes information identifying said first identifier and said one or more second identifiers, and wherein the network element is arranged to, upon receipt of a routing data packet from one of said other network elements, determine said information from said received routing data packet and to update said directory in respect of said other network element.

22. A network as claimed in claim 21, wherein said set of first protocols comprise Open Systems Interconnect (OSI) protocols.

23. A network as claimed in claim 22, wherein said first identifier comprises an OSI address.

24. A network as claimed in claim 22, arranged to support Intermediate System-to-Intermediate System (IS-IS) routing protocol.

25. A network as claimed in claim 21, wherein said set of second protocols comprise Internet Protocol (IP) protocol.

26. A network as claimed in claim 25, wherein said second identifier comprises an IP subnet.

27. A network as claimed in claim 21, wherein said first set of protocols comprise Internet Protocol (IP) protocol.

28. A network as claimed in claim 27, wherein said first identifier comprises an IP interface address.

29. A network as claimed in claim 27, arranged to support Integrated Intermediate System-to-Intermediate System (IS-IS) routing protocol.

30. A network as claimed in claim 21, wherein said second set of protocols comprise Open Systems Interconnect (OSI) protocols.

31. A network as claimed in claim 30, wherein said second identifier comprises an OSI address.

32. A network as claimed in claim 21, wherein said network element is arranged to act as an OSI level 1 router.

33. A network as claimed in claim 21, wherein the network comprises a plurality of network areas, at least one of said network areas being arranged to support IP protocols including Integrated IS-IS routing protocol, and at least one of said other network areas being arranged to support OSI protocols including IS-IS routing protocol.

34. A network as claimed in claim 33, wherein said network element is included in a network area that is arranged to support OSI, said network element being arranged to act as an OSI level 2 router.

35. In a network comprising network elements associated with a first identifier, complying with a set of one or more first protocols, and with one or more second identifiers, complying with a set of one or more second protocols, said network elements including a respective directory of first identifiers and respective second identifiers, a method of maintaining data tunnels, the method comprising:
    generating a routing data packet in respect of a network element, wherein said routing data packet includes information identifying said first identifier and said one or more second identifiers;
    causing said routing data packet to be distributed to each other network element;
    determining, upon receipt of a routing data packet from another network element, said information from said received routing data packet; and
    updating said directory in respect of said other network element.

36. A method as claimed in claim 35, wherein the routing data packet further includes a second identifier relating to an entity supporting said set of second protocols and being external of said network.

37. A method as claimed in claim 35, wherein the network element includes a routing information base that includes information identifying second identifiers associated with other network elements that are available across the network, the method further including:
    updating, upon receipt of a routing data packet from another network element, said routing information base in respect of said other network element.

38. A method as claimed in claim 35, wherein said set of first protocols comprise Open Systems Interconnect (OSI) protocols.

39. A method as claimed in claim 38, wherein said first identifier comprises an OSI address.

40. A method as claimed in claim 38, wherein said network elements are arranged to support Intermediate System-to-Intermediate System (IS-IS) routing protocol.

41. A method as claimed in claim 40, wherein said data routing packet comprises a Link State Protocol Data Unit (LSP) generated in accordance with integrated IS-IS routing protocol.

42. A method as claimed in claim 35, wherein said set of second protocols comprise Internet Protocol (IP) protocol.

43. A method as claimed in claim 42, wherein said second identifier comprises an IP subnet.

44. A method as claimed in claim 35, wherein said first set of protocols comprise Internet Protocol (IP) protocol.

45. A method as claimed in claim 44, wherein said first identifier comprises an IP interface address.

46. A method as claimed in claim 44, wherein said network elements are arranged to support Integrated Intermediate System-to-Intermediate System (IS-IS) routing protocol.

47. A method as claimed in claim 46, wherein said data routing packet comprises a Link State Protocol Data Unit (LSP) generated in accordance with Integrated IS-IS routing protocol.

48. A method as claimed in claim 35, wherein said second set of protocols comprise Open Systems Interconnect (OSI) protocols.

49. A method as claimed in claim 48, wherein said second identifier comprises an OSI address.

50. A method of maintaining data tunnels in an OSI protocol network comprising network elements that are associated with a respective OSI address and one or more respective IP subnets, each network element including a respective directory of OSI addresses and corresponding IP subnets, the method comprising:
    generating a routing data packet in respect of a network element, wherein said routing data packet includes information identifying said OSI address and said one or more IP subnets;
    causing said routing data packet to be distributed to each other network element;
    determining, upon receipt of a routing data packet from another network element, said information from said received routing data packet; and
    updating said directory in respect of said other network element.

51. A computer usable medium comprising computer program instructions for causing a network element to:
    generate a routing data packet comprising information identifying, in respect of said network element, a first identifier complying with a set of one or more first protocols; and one or more second identifiers complying with a set of one or more second protocols; and
    cause said routing data packet to be distributed across a network to one or more network elements;
    determine, upon receipt of a routing data packet from another network element, said information from said received routing data packet; and
    update a directory of first identifiers and respective second identifiers in respect of said an network element.

* * * * *